Sept. 19, 1933.   B. D. BEDFORD   1,927,676
ELECTRIC TIMING AND COUNTING DEVICE
Filed March 9, 1932   2 Sheets-Sheet 1

Inventor:
Burnice D. Bedford,
by Charles E. Mullan
His Attorney.

Sept. 19, 1933. B. D. BEDFORD 1,927,676
ELECTRIC TIMING AND COUNTING DEVICE
Filed March 9, 1932    2 Sheets-Sheet 2
Fig. 3.
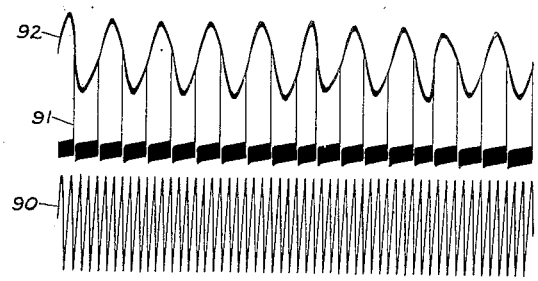
Fig. 4.
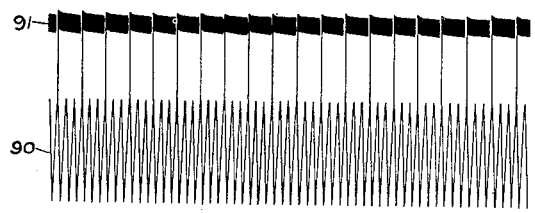
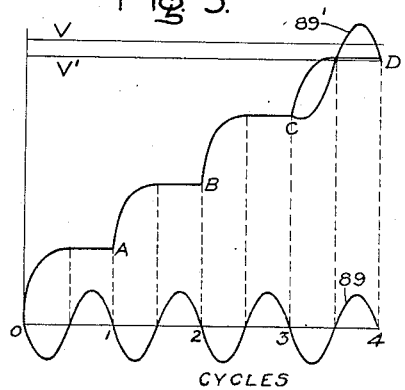
Fig 5.
Inventor:
Burnice D. Bedford,
by Charles Mullen
His Attorney.

Patented Sept. 19, 1933

1,927,676

UNITED STATES PATENT OFFICE 1,927,676

ELECTRIC TIMING AND COUNTING DEVICE

Burnice D. Bedford, Schenectady, N. Y., assignor to General Electric Company, a corporation of New York Application March 9, 1932. Serial No. 597,860

15 Claims. (Cl. 175—363)

My invention relates to electric timing and counting devices and concerns particularly the employment of electrical means including discharge tubes as counting or timing elements.

It is an object of my invention to provide apparatus for measuring time and time differences or for controlling the timing of operations.

Another object of my invention is to provide apparatus for counting impulses. An additional object of my invention is to provide a frequency converter or frequency divider for use with alternating-current circuits and particularly for use where the ratio of conversion is large. Other and further objects will become apparent as the description proceeds.

In accordance with my invention in its preferred form a plurality of condensers and current controlling devices, for example, electric discharge tubes are so connected in relation to a source of current that one of the condensers is alternately charged and discharged, and charges are transferred to one or more other condensers in such a manner that the potential acquired by the latter condensers is an indication of the number of impulses supplied to the apparatus.

Depending on the purpose for which the apparatus is employed, the operation of the current controlling devices may be effected by individual impulses to be counted or by reversals in polarity of an alternating-current circuit. Means responsive to voltage are provided to give an indication or to initiate the operation of other apparatus when a charge of a predetermined magnitude has been transferred to and stored by the charge collecting condenser. The features of my invention which I believe to be novel and patentable will be pointed out in the claims appended hereto.

Figure 1:
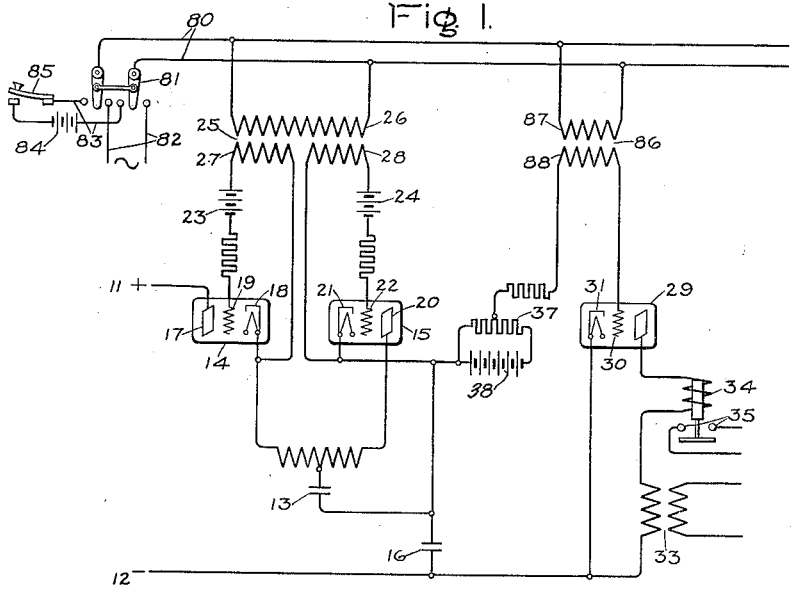
Figure 2:
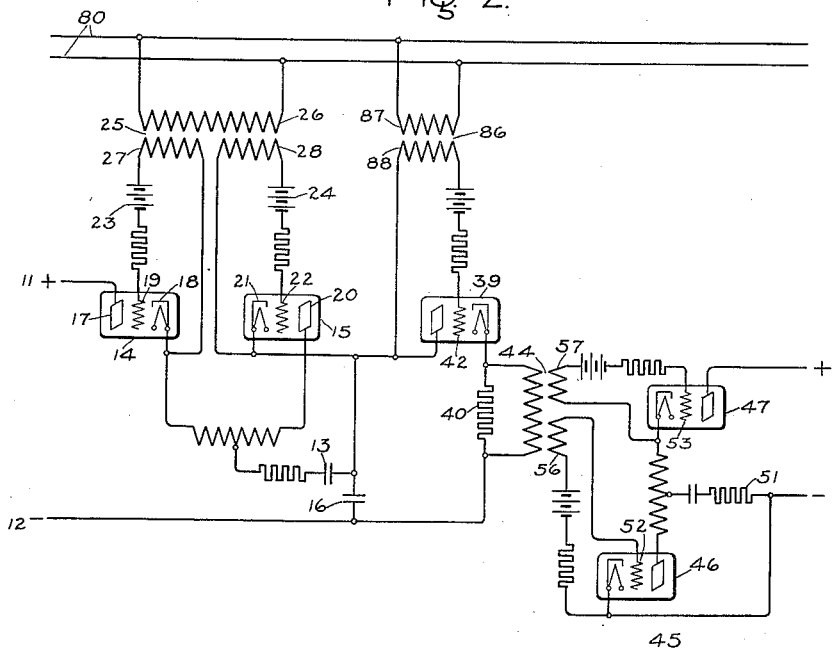

My invention itself, however, will be best understood by referring to the following description taken in connection with the accompanying drawings in which Fig. 1 represents schematically one form of a counting or timing device; Fig. 2 represents a converter or frequency divider; Fig. 3 represents a record of values of quantities in a fundamental form of a frequency converter; Fig. 4 represents a record of the values of certain quantities in a frequency converter of improved form in accordance with my invention; and Fig. 5 is a curve explaining the operation of the apparatus.

Referring now more in detail to the drawings in which like reference characters refer to like parts throughout, my invention relates to impulse responsive and timing devices of the type disclosed in co-pending application of Alan S. FitzGerald, Serial No. 597,855, filed March 9, 1932, and assigned to the same assignee as the present invention. A charge transferring condenser 13 and a charge collecting condenser 16 are connected in circuit with a suitable source of charging current which may, if desired, be a direct-current source having positive terminal 11 and negative terminal 12. The conductivity of the circuit is controlled by suitable devices 14 and 15 which are preferably electric valves. Valves 14 and 15 may take the form of three-element discharge tubes each having anodes 17 and 20 respectively, cathodes 18 and 21 respectively, and grids 19 and 22 respectively. The grids 19 and 22 are biased to suitable negative potentials by means of batteries 23 and 24 respectively. The transformer 25 having a primary winding 26, and secondary windings 27 and 28 connected between the cathodes and the grid batteries of the discharge tubes is utilized to control the conductivity of the tubes. Any suitable means responsive to potential, for example, the discharge tube 29 having a grid 30 connected through potentiometer 37 to one side of the condenser 16 and having cathode 31 connected to the other side of the condenser 16 is utilized to provide a desired response when condenser 16 has been charged to a predetermined potential. As here illustrated, the tube 29 is used to control the source of current 33 which energizes a contactor 34 having contacts 35.

Primary winding 26 of the transformer 25 is connected to a pair of conductors which may be supplied either with alternating current or with direct current impulses through a double-throw switch 81 arranged to make contact either with the alternating-current circuit 82 or with the direct-current circuit 83. The direct-current circuit 83 comprises the battery 84 and a circuit-making and -breaking device indicated at 85, which may be manually operated or controlled by other apparatus in any desired manner.

The operation of the device is as follows: In response to reversals in polarity of the voltages induced in windings 27 and 28 as a result of the alternations of the alternating-current circuit 82 or of the making and breaking of the direct-current circuit supplied by the source 84, depending on which connection is employed, the grids 19 and 22 of the discharge tubes 14 and 15 are alternately raised to a potential overcoming the negative bias produced by the batteries 23 and 24. Accordingly, the discharge tubes 14 and 15 become conducting alternately. While the discharge tube 14 is conducting, the condensers 13 and 16 are charged and when discharge tube 15 becomes conducting, the condenser 13 is discharged. However, as the charge transferring condenser 13 is alternately charged and discharged, the charge collecting condenser 16 is charged to successively higher potentials.

The amount of the negative bias impressed on grid 30 of discharge tube 29 by potentiometer 37 connected to grid battery 38 will determine the voltage at which the tube 29 becomes conducting and the apparatus responds. This voltage in turn depends upon the number of charges which have been supplied to charge collecting condenser 16. It will be understood that the apparatus controlled by tube 29 may be arranged either to operate a single time after a given number of impulses are supplied to transformer 25 or to repeat the operation after each group of a given number of impulses, whichever is desired. If the resistance of the grid circuit of the discharge tube 29 is sufficiently low, a discharge will take place from grid 30 to cathode 21 when the tube 29 becomes conducting, thereby restoring the charge collecting condenser 16 to zero potential and permitting the operation of the apparatus to be repeated in response to additional current impulses from conductors 80.

However, if the tube 29 is caused to become conducting while tube 14 is conducting and charge is continuing to flow into condenser 16, there may be a residual charge remaining on the condenser 16 after the operation of the device, depending on the time required for the grid bias of tube 29 to fall to the point where it is non-conducting. If the operation of the apparatus begins with a residual charge on condenser 16, obviously the number of cycles required before the tube 29 again becomes conducting is modified and the amount of residual charge after the following operation of the device will also be modified. Consequently, the residual charge of condenser 16 may be different after each operation resulting in fractional variations in the number of cycles or impulses required to produce a response in the apparatus.

In order to insure that the operation of the elements controlled by discharge tube 29 will always occur a fixed number of cycles after the impulses are started in transformer 25, an arrangement is provided for insuring that the operation will always take place during the period when discharge tube 14 is non-conducting so that after each operation initial conditions will be restored with condenser 16 completely discharged. This may be accomplished by impressing supplementary potentials on the grid 30 in synchronism with the impulses on transformer 25. The arrangement may, for example, take the form of a grid transformer 86 having a primary winding 87 connected to the same conductors 80 which supply primary winding 26 of transformer 25. A secondary winding 88 of the grid transformer 86 is interposed in the grid circuit of the tube 29, as here shown, between the grid 30 and the potentiometer 37.

The operation of the grid transformer may be better understood by reference to Fig. 5 which is the curve of potentials acquired by the charge collecting condenser 16 against time measured in cycles of an alternating-current circuit connected to leads 80. The expirations of successive half cycles are represented by the vertical dotted lines. During the first half of each half cycle, while the tube 14 is conducting, the potential rises along an exponential curve, and during the second half of each cycle, while the tube 14 is not conducting and the tube 15 is conducting, the potential remains constant, being represented by the flat portions of the curve terminating at the points A, B, C, and D. This curve represents an arrangement designed to respond on the fourth impulse or the fourth cycle. But obviously my invention is not limited to this exact arrangement. The connections of the grid transformer 86 are such that the voltage of the secondary winding 88 may be represented by the curve 89 plotted on the same time axis as the potential curve OABCD. The total potential on the grid 30 and discharge tube 29 is given by the algebraic sum of the voltages represented by curves CD and 89. The values of this sum during the fourth cycle are represented by the curve 89'.

It will be understood that without the use of the grid transformer, slight variations in residual charge remaining on condenser 16 after each operation of the apparatus will cause variations in the exact instant at which the potential curve CD intersects the horizontal line V' representing the amount of the grid bias of tube 29 which is normally required to cause operation after the fourth cycle. Fractional variations in the number of cycles required to cause an operation of the device are thereby introduced. If, however, the grid bias is given a value represented by the horizontal line V just above the maximum value acquired by the potential curve CD and the grid transformer is utilized, it will be seen that the operation of the apparatus will always occur in the flat portion of the curve CD since the potential of the grid is depressed during the first half of the cycle by the alternating voltage impressed by grid transformer 86, and the grid potential is made to rise relatively abruptly at the middle of the cycle, thereby preventing the discharge of tube 29 before the middle of the cycle and insuring sufficient voltage to cause a discharge immediately after the middle of the cycle. Obviously, the effect of the grid transformer 86 will be the same whether direct-current impulses or alternating-current are supplied to conductors 80.

In the arrangement shown in Fig. 2 the timing element and the grid transformer shown in Fig. 1 are used in connection with a frequency converter. An alternating current is supplied to the conductors 80, and after a predetermined number of cycles of this alternating-current circuit the condenser 16 is charged to a potential which causes the grid 42 of the discharge tube 39 to overcome its negative potential, thereby making the tube 39 conducting and discharging the condenser 16 through the tube 39 and the resistor 40. The discharges of current through resistor 40 cause momentary potential differences between the primary windings of the transformer 44. Consequently, voltage impulses are induced in the secondary windings 56 and 57 used to control the grids 52 and 53 of discharge tubes 46 and 47 forming a portion of the inverter 45 which may be of the type disclosed in the above mentioned copending application of Alan S. FitzGerald. As explained in connection with Fig. 1, if the grid transformer 86 is not used, there may be variations in the time intervals between successive discharges of the condenser 16. Consequently, the tubes 46 and 47 of the inverter 45 will not become conducting at regular intervals and the alternating-current wave produced in the load 51 by the inverter 45 is slightly irregular, as shown in Fig. 3, where the curve 90 represents the voltages impressed on the conductors 80, curve 91 represents the voltage impulses impressed on grids 52 and 53 by successive discharges of condenser 16, and curve 92 represents the output voltage of the inverter 45.

If the secondary winding 88 of the grid transformer 86 is interposed in the grid circuit of the discharge tube 39 the discharges of the condenser 16 through discharge tube 39 will be caused to occur at regular intervals in a fixed portion of the cycle of the alternating-current circuit 80. Accordingly, the result shown in Fig. 4 is obtained in which the successive impulses shown in curve 91 are regularly spaced, as may be seen by comparison with curve 90, and a regular voltage wave 93 is obtained from the inverter 45.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, means for charging a condenser to successively higher potentials in steps, means responsive to a predetermined potential thereof for discharging said condenser, and means for impressing additional control potentials on said potential responsive means within periods when said condenser potential is constant.

2. In combination, a charge transferring condenser, a charge collecting condenser in circuit therewith, means for alternately charging and discharging said charge transferring condenser and charging said charge collecting condenser by an amount dependent upon the charge of the first condenser to successively higher potentials, means responsive to a predetermined potential of said charge collecting condenser for discharging the same, means synchronized with said charging and discharging means for intermittently impressing additional control potentials upon said potential responsive means within the intervals when said charge-collecting condenser is not receiving a charge.

3. In combination, means for raising the potential of an electrical device in a series of abrupt increases, means responsive to a predetermined potential of said device, and means for impressing additional potentials on said potential responsive means within the intervals between said abrupt potential increases.

4. In combination with an alternating-current circuit, impulse responsive means comprising means for charging a condenser to successively higher potentials during portions of successive cycles of said alternating-current circuit, means responsive to a predetermined potential for discharging said condenser, means for impressing additional control voltages on said potential responsive means within the portions of the cycles of said alternating-current circuit when said condenser is not receiving a charge, and an inverter arranged to produce alternating current having a frequency determined by the rate at which said condenser is charged and discharged.

5. Apparatus responsive to a given number of impulses comprising a source of charging current, a condenser in circuit therewith, means for causing said circuit to become conducting in response to each of said impulses for charging said condenser to successively higher potentials in steps, means responsive to a predetermined potential for discharging said condenser, and means for impressing an additional control potential on said potential responsive means in response to each of said impulses but after said charging circuit has ceased to be conducting.

6. Apparatus responsive to a given number of impulses comprising a source of charging current, a condenser and an electrical valve in circuit, means for controlling the conductivity of said valve in response to said impulses for charging said condenser to successively higher potentials, means in circuit with said condenser and responsive to a predetermined potential for discharging said condenser, and means for impressing, within the intervals that said valve is non-conducting, additional synchronizing potentials on said potential responsive means in response to each of said impulses.

7. Apparatus responsive to a given number of impulses comprising a source of charging current, a condenser and a grid controlled discharge tube in circuit, means for varying the grid potential of said discharge tube in response to said impulses to control the conductivity of said tube for charging said condenser to successively higher potentials in steps, means responsive to a predetermined potential, and means for impressing an additional control potential on said potential responsive means in response to each of said impulses after said tube has ceased to be conducting.

8. In combination with a source of electrical impulses, apparatus responsive to a given number of said impulses comprising a source of charging current, a condenser and a discharge tube in circuit, said discharge tube having a control grid, an induction device having a primary winding connected to said source of electrical impulses, and a secondary winding connected to said control grid thereby controlling the conductivity of said tube and causing said condenser to be charged to higher potentials with successive impulses, means responsive to a predetermined potential for discharging said condenser, a second induction device having a primary winding connected to said source of electrical impulses, and a secondary winding in circuit with said condenser and said potential responsive means so connected that additional control potentials are impressed on said potential responsive means while the polarity of the secondary winding of said first-mentioned induction device is such as to retain said tube non-conducting.

9. In combination, a source of current, a pair of condensers and conductivity controlling means connected to charge and discharge alternately one of said condensers and intermittently to charge the other of said condensers to successively higher potentials, means responsive to a predetermined potential for discharging said latter condenser, and means synchronized with said charging and discharging means for intermittently impressing additional control potentials on said potential responsive means within the periods that the second of said condensers is not receiving a charge.

10. Apparatus responsive to a given number of electrical impulses comprising a source of charging current, a charge transferring condenser, a charge collecting condenser, and a pair of electrical valves, means for causing said valves alternately to become conducting in response to said impulses, connections to alternately charge and discharge said charge transferring condenser and intermittently charge said charge collecting condenser to higher potentials with successive impulses, means in circuit with said charge collecting condenser and responsive to a predetermined potential, and means for intermittently impressing additional control potentials on said potential responsive means in response to said impulses within the periods that said charge-collecting condenser is not receiving a charge.

11. Apparatus responsive to a given number of electrical impulses comprising a source of charging current, a charge transferring condenser, a charge collecting condenser, and a pair of grid controlled discharge tubes, means for modifying the grid potentials of said tubes alternately in response to said electrical impulses for the purpose of causing said discharge tubes alternately to become conducting, connections to charge and discharge said charge transferring condenser and progressively charge said charge collecting condenser to higher potentials with successive impulses, means in circuit with said charge collecting condenser and responsive to a predetermined potential, and means for intermittently impressing additional control potentials on said potential responsive means in response to said impulses within periods when said charge-collecting condenser is not receiving a charge.

12. In combination with a source of electrical impulses, apparatus responsive to a given number of said electrical impulses comprising a source of charging current, a charge transferring condenser, a charge collecting condenser, and a pair of discharge tubes, said discharge tubes having control grids, an induction device having a primary winding connected to said source of electrical impulses and secondary windings each connected to one of said control grids to modify the grid potentials of said tubes alternately in response to said electrical impulses for the purpose of causing said discharge tubes alternately to become conducting, connections to charge and discharge said charge transferring condenser and progressively charge said charge collecting condenser to higher potentials with successive impulses, means responsive to a predetermined potential, a second induction device having a primary winding connecting to said source of electrical impulses, and a secondary winding in circuit with said condenser and said potential responsive means so connected that an additional control potential is impressed on said potential responsive means in response to each of said impulses within the period that the polarity of said first-mentioned induction device is such that the charging circuit for said charge-collecting condenser is non-conducting.

13. In combination with an alternating-current circuit, an impulse responsive device comprising a charge transferring condenser, a charge collecting condenser in circuit therewith, means for alternately charging and discharging said charge transferring condenser and charging said charge collecting condenser by an amount dependent upon the charge of the charge transferring condenser to successively higher potentials during portions of successive cycles of said alternating-current circuits, means responsive to a predetermined potential for discharging said charge collecting condenser, means for impressing additional control voltages on said potential responsive means within the portions of the cycles of said alternating-current circuit when said charge-collecting condenser is not receiving a charge, and an inverter arranged to produce alternating current having a frequency determined by the rate at which said charge collecting condenser is charged and discharged.

14. In combination with an alternating-current circuit, impulse responsive means comprising a source of charging current, a condenser in circuit therewith, means for causing said charging circuit to become alternately conducting and non-conducting in response to reversals in polarity of said alternating-current circuit thereby intermittently charging said condenser to successively higher potentials in response to successive cycles of said alternating-current circuit, means responsive to a predetermined potential for discharging said condenser, means for impressing additional control voltages on said potential responsive means synchronously with the cycles of said alternating-current circuit when said charging circuit becomes non-conducting, and an inverter arranged to produce alternating current having a frequency determined by the rate at which said condenser is charged and discharged.

15. In combination with an alternating-current circuit, impulse responsive means comprising a source of charging current, a condenser and an electrical valve in circuit, means for controlling the conductivity of said valve in response to the alternations of said alternating-current circuit, connections for charging said condenser to successively higher potentials during portions of successive cycles of said alternating-current circuit, means responsive to a predetermined potential for discharging said condenser, means for impressing additional control voltages on said potential responsive means within the portions of the cycles of said alternating-current circuit when said condenser is not receiving a charge, and an inverter arranged to produce alternating current having a frequency determined by the rate at which said condenser is charged and discharged.

BURNICE D. BEDFORD.